(12) United States Patent
Spatafora et al.

(10) Patent No.: US 6,863,172 B2
(45) Date of Patent: Mar. 8, 2005

(54) PACKET SUPPLY UNIT AND METHOD

(75) Inventors: Mario Spatafora, Bologna (IT); Loris Grepioni, Castel Maggiore (IT)

(73) Assignee: GD Societa per Azioni, Bologna (IT)

( * ) Notice: Subject to any disclaimer, the term of this patent is extended or adjusted under 35 U.S.C. 154(b) by 0 days.

(21) Appl. No.: 10/635,303

(22) Filed: Aug. 6, 2003

(65) Prior Publication Data

US 2004/0099504 A1 May 27, 2004

(30) Foreign Application Priority Data

Aug. 8, 2002 (IT) .................................... BO2002A0530

(51) Int. Cl.[7] .............................................. B65G 47/10
(52) U.S. Cl. ............... 198/370.12; 197/438; 197/626.1; 197/689.1
(58) Field of Search ............................. 198/438, 626.1, 198/689.1, 370.12

(56) References Cited

U.S. PATENT DOCUMENTS

| | | | | |
|---|---|---|---|---|
| 2,941,653 A | * | 6/1960 | Kriemelmeyer, Jr. | ....... 198/438 |
| 3,140,780 A | * | 7/1964 | Eberhard et al. | ........... 198/438 |
| 3,757,926 A | * | 9/1973 | Gendron et al. | ....... 198/370.12 |
| 4,304,508 A | * | 12/1981 | Wolf | ............................ 406/78 |
| 4,964,500 A | * | 10/1990 | Gooden | ...................... 198/380 |
| 5,125,217 A | * | 6/1992 | Fukuda | ........................ 53/551 |
| 5,170,881 A | * | 12/1992 | Willison | .................. 198/689.1 |
| 5,197,937 A | * | 3/1993 | Dalrymple | .................. 493/167 |
| 5,245,897 A | * | 9/1993 | Arnold et al. | ................. 83/56 |
| 5,564,693 A | * | 10/1996 | Elkis et al. | ................. 271/276 |
| 5,600,906 A | * | 2/1997 | Hamid | ........................ 38/143 |
| 5,819,907 A | * | 10/1998 | Simkowski | ............. 198/689.1 |
| 6,044,959 A | * | 4/2000 | Monsees | ................. 198/461.1 |

FOREIGN PATENT DOCUMENTS

| | | |
|---|---|---|
| DE | 687 587 | 2/1940 |
| DE | 41 19 514 | 12/1992 |

* cited by examiner

*Primary Examiner*—Richard Ridley
(74) *Attorney, Agent, or Firm*—Marshall, Gerstein & Borun LLP

(57) ABSTRACT

A unit for supplying packets of cigarettes has a first and a second belt conveyor, which respectively define a first and a second path having a common portion; and a routing device extending about the first and second belt conveyor at the common portion, and cooperating with the belts of the first and second belt conveyor.

9 Claims, 3 Drawing Sheets

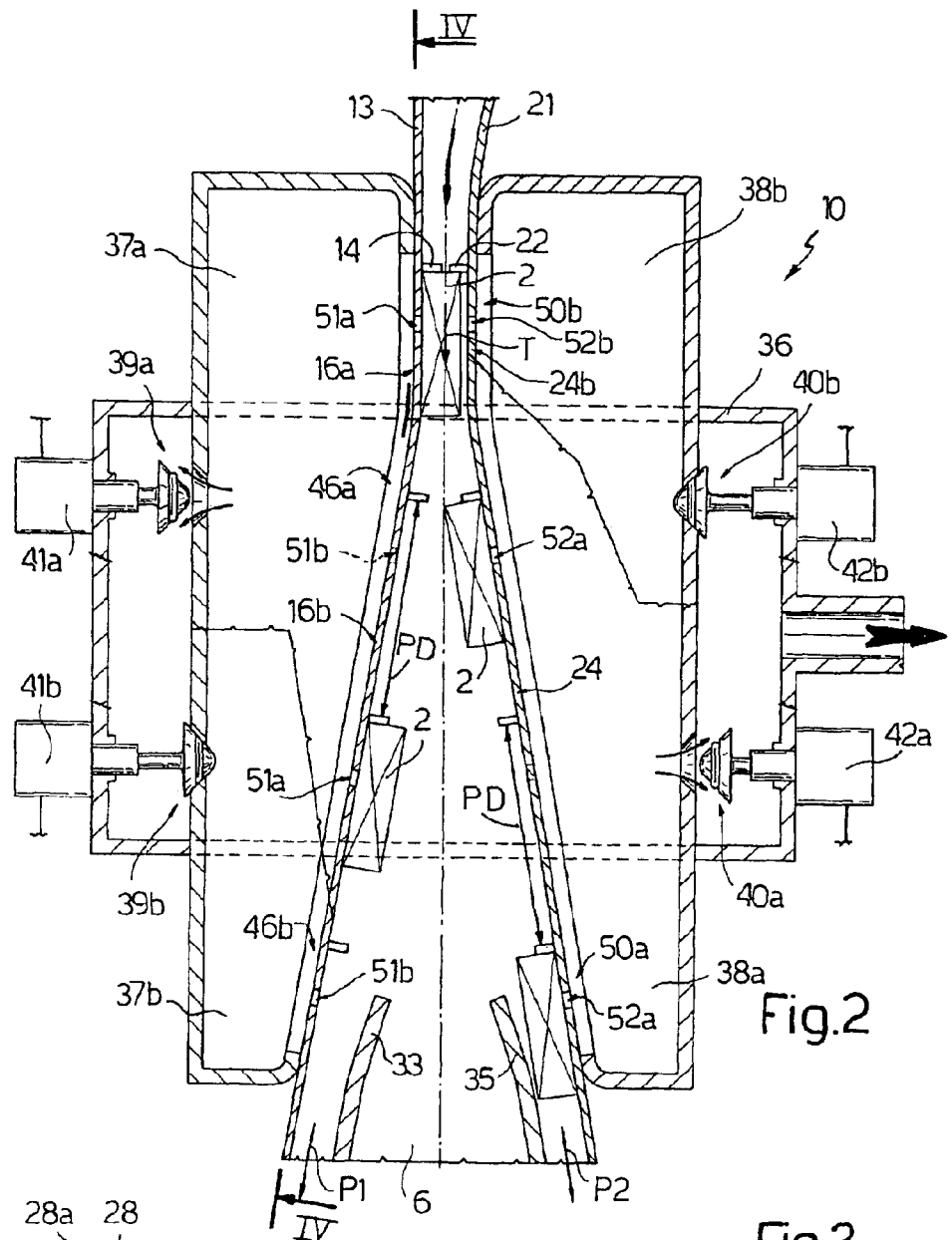
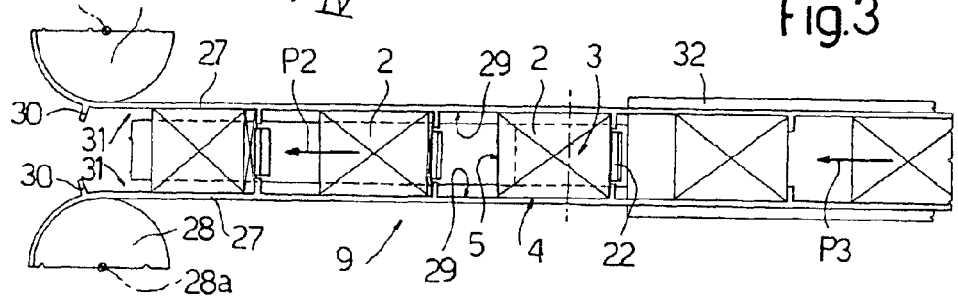

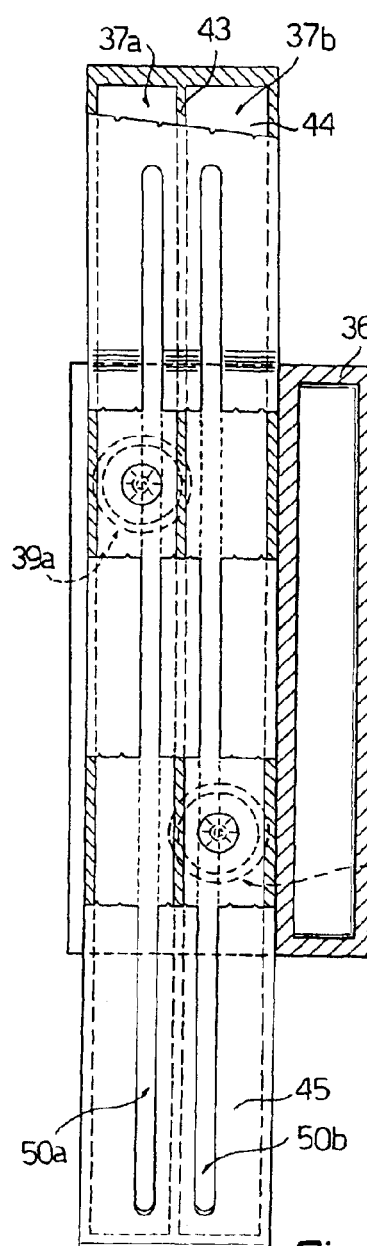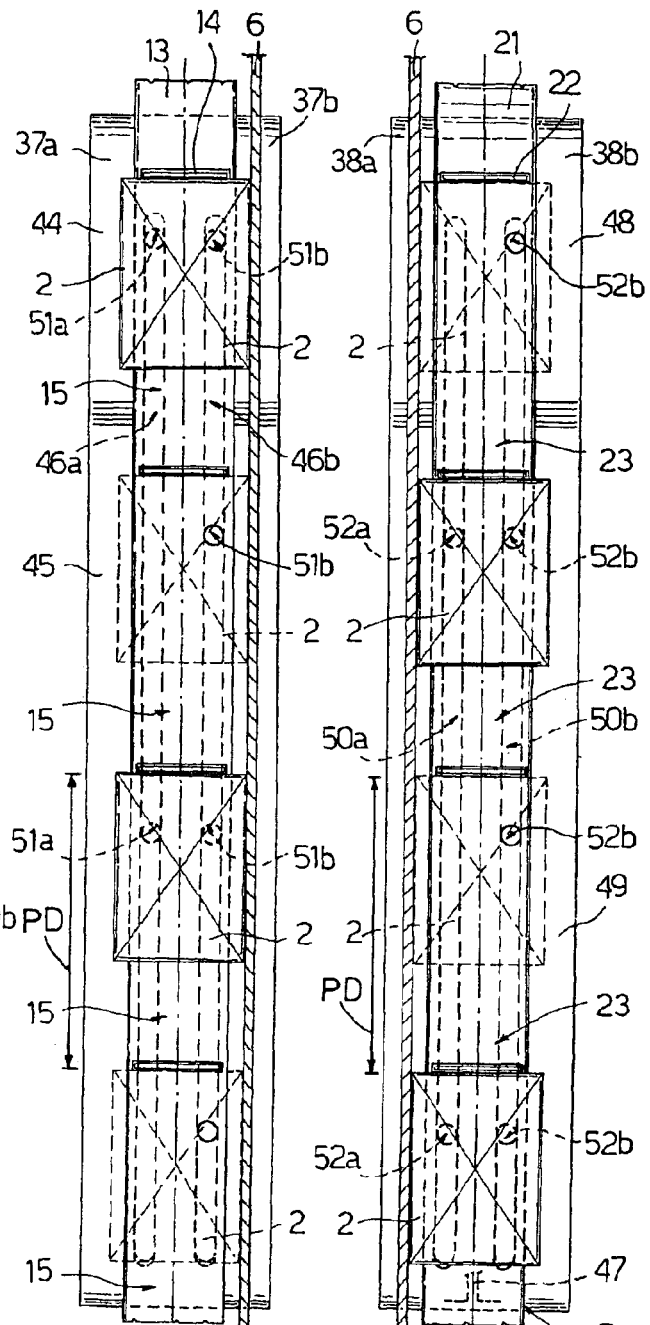

PACKET SUPPLY UNIT AND METHOD

The present invention relates to a packet supply unit.

More specifically, the present invention relates to a unit for supplying packets of cigarettes and dividing a main stream of packets of cigarettes into two secondary streams of packets of cigarettes, to which the following description refers purely by way of example.

BACKGROUND OF THE INVENTION

Patent Application DE-A-41,19,514 describes a unit for supplying packets of cigarettes, which comprises a first and second belt conveyor located one over the other and respectively defining a first and second path having a common portion, and two diverging portions downstream from the common portion; and a routing device located at the common portion and having a suction chamber with a suction port along the first belt conveyor to suck the packets on to the belt of the first conveyor and feed the packets along the first path. When the suction chamber is idle, the packets are conveyed by the second conveyor, on which the packets rest by force of gravity.

Though highly versatile in dividing the main stream of packets of cigarettes as required, the above unit has drawbacks when dividing the main stream into two secondary streams, each with a spacing equal to twice that of the main stream, i.e. when the packets of cigarettes in the main stream are fed alternately along the first and second path, which would call for rapidly alternating on-off operation of the suction chamber. Rapidly alternating vacuums are difficult to achieve, on account of the inevitable inertia involved, and also produce rapid wear of control members, such as valves and respective actuating members.

SUMMARY OF THE INVENTION

It is an object of the present invention to provide a packet supply unit designed to eliminate the aforementioned drawbacks.

According to the present invention, there is provided a unit for supplying packets, comprising a first and a second belt conveyor, which respectively define a first and a second path having a common portion, and respectively comprise a first and a second belt; and a routing device located at said common portion; the unit being characterized in that said routing device comprises suction chambers cooperating with the first and second belt.

The present invention also relates to a packet supply method.

According to the present invention, there is provided a method of supplying packets by means of a first and a second belt conveyor, which respectively define a first and a second path having a common portion, and respectively comprise a first and a second belt; the method providing for feeding a continuous, orderly succession of packets along said common portion, and routing the packets along the first and second path by means of a routing device; and the method being characterized by drawing given packets by suction on to the first belt, and drawing the other packets by suction on to the second belt, by means of suction chambers cooperating with the first and second belt.

BRIEF DESCRIPTION OF THE DRAWINGS

A non-limiting embodiment of the present invention will be described by way of example with reference to the accompanying drawings, in which:

FIG. 2 shows a larger-scale side view, with parts in section and parts removed for clarity, of a detail of the FIG. 1 unit;

FIG. 3 shows a larger-scale plan view, with parts removed for clarity, of a detail of the FIG. 1 unit;

FIG. 4 shows a section, with parts removed for clarity and parts sectioned further, of the FIG. 2 detail along line IV—IV;

FIG. 5 shows a spread-out front view of a portion of a first conveyor of the FIG. 1 unit, and part of the FIG. 1 unit itself;

FIG. 6 shows a spread-out front view of a portion of a second conveyor of the FIG. 1 unit, and part of the FIG. 1 unit itself.

DETAILED DESCRIPTION OF THE INVENTION

Figure 1:
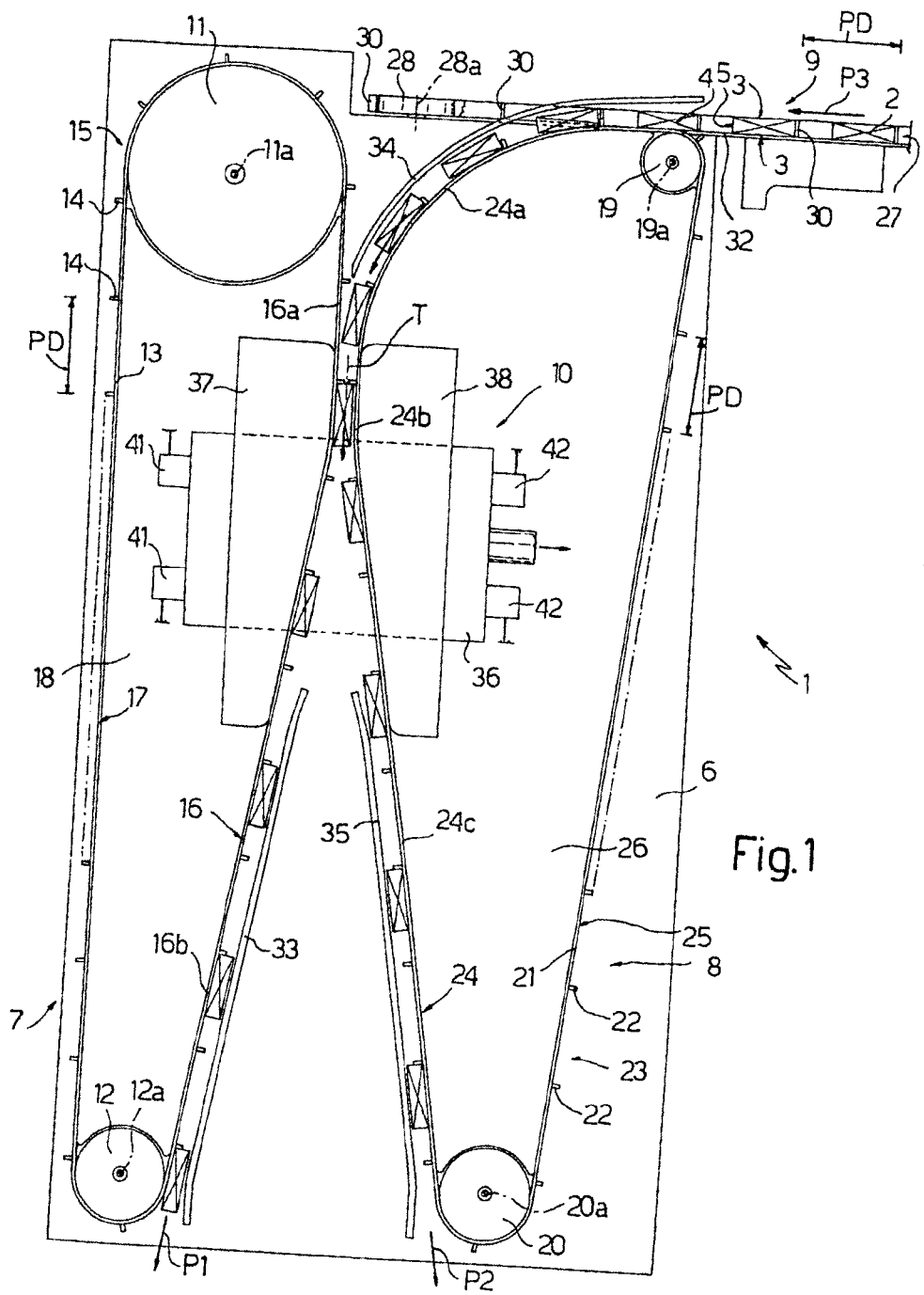
FIG. 1 shows a side view of a packet supply unit in accordance with the present invention.

Number 1 in FIG. 1 indicates as a whole a unit for supplying packets 2 of cigarettes, each comprising two main faces 3, two lateral faces 4, and two end faces 5.

Unit 1 comprises a frame 6, which supports two belt conveyors 7 and 8 respectively defining two paths P1 and P2 for packets 2 of cigarettes; a conveyor 9 defining a supply path P3 having a portion in common with path P2; and a routing device 10 for routing packets 2. Conveyors 7 and 8 face each other and are relatively close and parallel along respective intermediate portions, so that respective paths P1 and P2 have a vertical common portion T.

Conveyor 7 comprises two pulleys 11 and 12 rotating about respective axes 11a and 12a; and a belt 13 looped about pulleys 11 and 12 and having transverse projections 14. Projections 14 are spaced along belt 13 with a spacing PD to define, between each two successive, adjacent projections 14, a seat 15 for housing a packet 2 of cigarettes. Conveyor 7 comprises a work branch 16; a return branch 17; and a rigid support 18, which, together with routing device 10, defines, along work branch 16, two straight portions 16a and 16b forming an obtuse angle.

Conveyor 8 comprises two pulleys 19 and 20 rotating about respective axes 19a and 20a; and a belt 21 looped about pulleys 19 and 20 and having transverse projections 22. Projections 22 are spaced along belt 21 with a spacing PD to define, between each two successive, adjacent projections 22, a seat 23 for housing a packet 2 of cigarettes. Conveyor 8 comprises a work branch 24; a return branch 25; and a rigid support 26, which, together with routing device 10, defines, along work branch 24, a curved portion 24a, and two straight portions 24b and 24c forming an obtuse angle.

With reference to FIGS. 1 and 3, conveyor 9 comprises two belts 27, which are looped about respective pulleys 28 rotating about vertical axes 28a, and have two facing, parallel work branches 29. Each belt 27 has projections 30 equally spaced with a spacing PD to define, between each two successive, adjacent projections 30, a seat 31 for a packet 2 of cigarettes. Conveyor 9 also comprises a supporting plate 32 defining a sliding surface for packets 2 and connected to curved portion 24a of work branch 24 of conveyor 8.

Unit 1 also comprises guides 33, 34, 35 integral with frame 6 and cooperating with conveyors 7 and 8.

With reference to FIGS. 1 and 2, device 10 extends about conveyors 7 and 8 at portion T, and comprises a manifold 36 connected to a suction source not shown in the drawings; and four suction chambers 37a, 37b, 38a, 38b, which are selectively connected to manifold 36 by respective valves 39a, 39b, 40a, 40b controlled independently by respective actuators 41a, 41b, 42a, 42b. Manifold 36, viewed from above, is C-shaped; and suction chambers 37a, 37b, 38a, 38b, viewed from the side, have a trapezium-shaped section, are located partly along portion T and partly along diverging portions of paths P1 and P2, and are connected in pairs so that chambers 37a and 37b cooperate with belt 13 of conveyor 7, and chambers 38a and 38b cooperate with belt 21 of conveyor 8. With reference to FIGS. 4 and 5, chambers 37a and 37b are separated by a partition 43, and have two walls 44 and 45 in common, along which belt 13 runs, and along which are formed two slots 46a and 46b parallel to path P1.

With reference to FIG. 6, chambers 38a and 38b are separated by a partition 47, and have two walls 48 and 49 in common, along which belt 21 runs, and along which are formed two slots 50a and 50b parallel to path P2.

With reference to FIG. 5, belt 13 has a first succession of holes 51a spaced with a spacing equal to twice spacing PD and aligned with slot 46a, so that alternate seats 15 have a hole 51a. Belt 13 also has a second succession of holes 51b spaced with spacing PD and aligned with slot 46b, so that each seat 15 has a hole 51b.

With reference to FIG. 6, belt 21 has a first succession of holes 52a spaced with a spacing equal to twice spacing PD and aligned with slot 50a, so that alternate seats 23 have a hole 52a. Belt 21 also has a second succession of holes 52b spaced with spacing PD and aligned with slot 50b, so that each seat 23 has a hole 52b.

In actual use, and with reference to FIGS. 1 and 3, a continuous, orderly stream of packets 2 is supplied by conveyor 9. Each packet 2 is housed in a respective seat 31, with one of main faces 3 resting on plate 32. Belts 27 contact lateral faces 4 of each packet 2, and each projection 30 contacts an end face 5 of a respective packet 2. On reaching curved portion 24a of work branch 24 of conveyor 8, each packet 2 is transferred gradually from seat 30 to a seat 23 on conveyor 8, and is fed along path P2. Conveyors 7 and 8 are operated so that respective seats 15 and 23 are timed with one another, and, in particular, are positioned facing at portion T common to paths P1 and P2.

Along portion T, each packet 2 therefore occupies a seat 15 and the corresponding facing seat 23, and routing device 10 routes packets 2 along conveyors 7 and 8 by means of suction chambers 37a, 37b, 38a, 38b.

The embodiment shown in the accompanying drawings, provides for three types of routing:
  dividing the continuous, orderly stream of packets 2 into two orderly streams of packets 2 along paths P1 and P2, the spacing of each orderly stream being twice spacing PD;
  feeding the whole continuous, orderly stream of packets 2 along path P1;
  feeding the whole continuous, orderly stream of packets 2 along path P2.

The above three routing modes are all effected by so timing seats 15 and 23 that a seat 15 with a hole 51b is positioned opposite a seat 23 with a hole 52a and a hole 52b, and a seat 23 with a hole 52b is positioned opposite a seat 15 with a hole 51a and a hole 51b.

The first routing mode is effected by keeping valves 39a and 40a open and valves 39b and 40b closed, so that a low pressure is formed in chambers 37a and 38a, while chambers 37b and 38b are idle, i.e. at ambient pressure. As holes 51a and 52a travel along respective slots 46a and 50a, the low pressure in respective chambers 37a and 38a retains packets 2 alternately inside seats 15 and 23. And, since seats 15 and 23 are timed so that holes 51a and 52a alternate, packets 2 are drawn alternately by suction to belt 13 and belt 21 and conveyed along path P1 and path P2.

The second routing mode is effected by keeping valve 39b open and valves 39a, 40a, 40b closed, so that the low pressure only acts through slot 46b and holes 51b, and packets 2 are all conveyed along path P1.

The third routing mode is effected by keeping valve 40b open and valves 39a, 39b, 40a closed, so that the low pressure only acts through slot 50b and holes 52b, and packets 2 are all conveyed along path P2.

In a variation not shown, belts 13 and 21 may have hole arrangements other than those shown, to route the main stream on a different basis.

In a further variation not shown, the routing device has three or more chambers at each belt, and each belt has three or more successions of holes to permit more than three types of routing modes.

What is claimed is:

1. A unit for supplying packets (2), comprising a first and a second belt conveyor (7, 8), which respectively define a first and a second path (P1, P2) having a common portion (T), and respectively comprise a first and a second belt (13, 21) having respective first and second seats (15, 23), each for housing a respective packet (2); wherein each first seat (15) faces and is timed with a respective second seat (23) along said common portion (T); and a routing device (10) located at said common portion (T) and comprising a first and a second suction chamber (37a, 38a) having, respectively, a first and a second slot (46a, 50a) cooperating respectively with the first and second belt (13, 21); the first and second belt (13, 21) comprising a first and a second succession of holes (51a, 52a) cooperating respectively with the first and second slot (46a, 50a); each hole (51a, 52a) being movable along a respective slot (46a, 50a), so as to activate suction when one of said holes (51a, 52a) is aligned with a respective slot (46a, 50a); the first succession of holes (51a) being so arranged as to comprise one hole (51a) for every two first seats (15); the second succession of holes (52a) being so arranged as to comprise one hole (52a) for every two second seats (23); and the first and second seats (15, 23) being so timed with one another that a first seat (15) with one hole (51a) in the first succession of holes (51a) is timed with a second seat (23) having no holes (52a) in the second succession of holes (52a).

2. A unit as claimed in claim 1, wherein each of the suction chambers (37a, 38a) comprises a first wall (44, 47) parallel to the common portion (T), and a second wall (45, 48) sloping with respect to the common portion (T); the first and the second wall (44, 47, 45, 48) supporting the first or second belt (13, 21).

3. A unit as claimed in claim 2, wherein each of said slots (46a, 50a) extends along a first and a second wall (44, 47, 45, 48).

4. A unit as claimed in claim 1, wherein said routine device (10) comprises a third and a fourth suction chamber (37b, 38b) having, respectively, a third and a fourth slot (46b, 50b) cooperating respectively with the first and second belt (13, 21); the first and second belt (13, 21) comprising a third and a fourth succession of holes (51b, 52b) cooperating respectively with the third and fourth slot (46b, 50b).

5. A unit as claimed in claim 4, wherein the third succession of holes (51b) is so arranged as to comprise one hole (51b) for every first seat (15); and the second succession of holes (52b) is so arranged as to comprise one hole (52b) for every second seat (23).

6. A unit as claimed in claim 1, wherein said suction chambers (37a, 38a) communicate selectively with a suction manifold (36).

7. A unit as claimed in claim 6, wherein each of said suction chambers (37a, 38a) has a respective valve (39a; 40a).

8. A unit as claimed in claim 1, wherein said common portion (T) of the first and second path (P1, P2) is vertical.

9. A method of supplying packets (2) by means of a first and a second belt conveyor (7, 8), which respectively define a first and a second path (P1, P2) having a common portion (T), and respectively comprise a first and a second belt (13, 21) having respective first and second seats (15, 23), each for housing a respective packet (2); wherein each first seat (15) faces and is timed with a respective second seat (23) along said common portion (T); the method providing for feeding a continuous, orderly succession of packets (2) along said common portion (T), routing the packets along the first and second path (P1, P2) by means of a routing device (10);

drawing given packets by suction on to the first belt (13), and drawing the other packets by suction on to the second belt (21), by means of a first and a second suction chamber (37a, 38a) having, respectively, a first and a second slot (46a, 50a) cooperating respectively with the first and second belt (13, 21);

activating said first and a second suction chamber (37a, 38a) by means of a first and a second succession of holes (51a, 52a) cooperating respectively with the first and second slot (46a, 50a);

moving each hole (51a, 52a) alone a respective slot (46a, 50a), so as to activate suction when one of said holes (51a, 52a) is aligned with a respective slot (46a, 50a);

arranging the first succession of holes (51a) so as to comprise one hole (51a) for every two first seats (15);

arranging the second succession of holes (52a) so as to comprise one hole (52a) for every two second seats (23); and timing the first and second seats (15, 23) with one another so that a first seat (15) with one hole (51a) in the first succession of holes (51a) is timed with a second seat (23) having no holes (52a) in the second succession of holes (52a).

* * * * *

UNITED STATES PATENT AND TRADEMARK OFFICE
CERTIFICATE OF CORRECTION

PATENT NO.    : 6,863,172 B2
DATED         : March 8, 2005
INVENTOR(S)   : Spatafora et al.

Page 1 of 1

It is certified that error appears in the above-identified patent and that said Letters Patent is hereby corrected as shown below:

<u>Title page,</u>
Item [73], Assignee, "GD Societa per Azioni" should be -- G.D Societa' per Azioni --.

<u>Column 4,</u>
Line 56, "routine" should be -- routing --.

Signed and Sealed this

Sixteenth Day of August, 2005

JON W. DUDAS
*Director of the United States Patent and Trademark Office*